United States Patent [19]

Fremgen et al.

[11] Patent Number: 5,399,811
[45] Date of Patent: Mar. 21, 1995

[54] DEVICE FOR SEALING CABLES ENTERING A CABLE COUPLING SLEEVE

[75] Inventors: Dieter Fremgen, Wülfrath; Friedbert Papenheim, Unna, both of Germany

[73] Assignee: Walter Rose GmbH & Co. KG, Germany

[21] Appl. No.: 987,273

[22] PCT Filed: Sep. 12, 1991

[86] PCT No.: PCT/GB91/01561
§ 371 Date: Mar. 9, 1993
§ 102(e) Date: Mar. 9, 1993

[87] PCT Pub. No.: WO92/05609
PCT Pub. Date: Apr. 2, 1992

[30] Foreign Application Priority Data

Sep. 13, 1990 [DE] Germany ............... 40 29 082.4

[51] Int. Cl.$^6$ ............................... H02G 15/10
[52] U.S. Cl. ........................... 174/93; 174/38; 174/39; 174/77 R; 174/92
[58] Field of Search ............ 174/92, 93, 77 R, 87, 174/38, 39

[56] References Cited

U.S. PATENT DOCUMENTS

| 4,103,911 | 8/1978 | Giebel et al. ........... 174/77 R X |
| 4,117,259 | 9/1978 | Giebel et al. ........... 174/92 |
| 4,346,258 | 8/1982 | Kunsa ........................ 174/93 |
| 4,424,412 | 1/1984 | Goetter et al. .......... 174/92 |
| 4,902,856 | 2/1990 | Miller . | |
| 4,914,261 | 4/1990 | Tokumaru et al. ........ 174/92 |
| 5,055,636 | 10/1991 | Jaycox ....................... 174/87 |
| 5,059,748 | 10/1991 | Allen et al. ............. 174/87 |
| 5,245,133 | 9/1993 | DeCarlo et al. .......... 174/93 |

FOREIGN PATENT DOCUMENTS

| 1109534 | 9/1981 | Canada . |
| 0029571A1 | 6/1981 | European Pat. Off. . |
| 0236141As | 9/1987 | European Pat. Off. . |
| 2388432 | 11/1978 | France . |
| 2209629 | 9/1973 | Germany . |
| 2421815 | 11/1975 | Germany . |
| 2427677 | 12/1975 | Germany . |
| 7247256 | 3/1976 | Germany . |
| 7725370 | 2/1978 | Germany . |
| 2947139A1 | 5/1981 | Germany . |
| 7733831 | 3/1987 | Germany . |
| 1506522 | 4/1978 | United Kingdom . |
| 1603626 | 11/1981 | United Kingdom . |
| 2193605A | 2/1988 | United Kingdom . |

Primary Examiner—Morris H. Nimmo
Attorney, Agent, or Firm—Herbert C. Burkard; A. Stephen Zavell; William D. Zahrt, II

[57] ABSTRACT

A device for sealing cables entering a cable coupling sleeve, comprises a sealing plate consisting of at least two elements which fit together to form openings for insertion of cables. The sealing plate is formed by a substantially centrally arranged inner disc element (5) having opening regions at its outer edge, and by ring elements (6) which externally surround all the opening regions when the device is in its closed position. Optionally sealing material may be positioned around the cables.

19 Claims, 4 Drawing Sheets

DEVICE FOR SEALING CABLES ENTERING A CABLE COUPLING SLEEVE

This invention relates to a device for sealing cables entering a cable coupling sleeve, and in particular to such a device comprising a multi-element sealing plate which contains openings for insertion of cables, and which also provides a seal between the openings and the cables.

The shape of a cable coupling sleeve depends on the type of cable joint to be enclosed. Where the joint is a simple in-line joint between two wires or cables, a sleeve or tubular device may be used. Where a main cable is to be divided into many smaller cables a dome shaped housing may be used. Such a dome-shaped housing typically has a base through which a loop of an uncut main cable is inserted and through which a plurality of smaller wires or cables leave, the smaller wires or cables being spliced in the housing to the main cable.

EP 0094848 describes a dome shaped housing with a base as described above. The base comprises heat shrinkable outlets extending into or out of the housing which can be shrunk onto the cables to seal them.

DE 2427677 describes a base which can form part of a cable coupling sleeve, which base, as in the present invention, comprises a multi element, mechanical sealing plate. The device disclosed therein consists substantially of three plate elements, which fit together to provide three circular openings between adjacent pairs of plates, which openings act as feedthrough regions for entering cables. The three plate elements of the device have such a shape that each feedthrough opening is divided centrally that is half of its periphery is provided by one plate, and half by another plate. The plates are tightened towards one another by screw connections. In order to produce the cable feedthrough openings in the plates, they may be cut or drilled in.

While the known mechanical sealing arrangement described in DE 2427677 has a number of advantages, because of the nature of its construction it also has a considerable disadvantage, in that there is a limit to the number of openings that can be produced between abutting parts of adjacent plates. Also the number of openings are limited if an uncut main cable is to be introduced. Furthermore it is not possible to vary the sealing tightness on the individual inserted cables since tightening of the plates acts on all the cables.

GB 1603626 describes an assembly for protecting a splice between cables comprising a longitudinally split tube in the form of half shells and two blocks positioned on either side of the splice, within the longitudinally split tube, each block containing channels for receiving cables. Sealant damming means biased to act outwardly against the channels may be included, and individual cables may be wrapped with adhesive tape before insertion into the channels An object of the present invention is to provide a solution whereby a plurality of cables can be introduced in the cut or uncut state into a cable coupling sleeve. Another object of the invention is to provide a solution so that the number of incoming and outgoing cables to the cable coupling sleeve can be altered, subsequent to the initial installation, without any problems.

The present invention provides a device for sealing a cable joint, comprising:

(a) a cable coupling housing;

(b) a sealing plate that can fit at one end of the housing comprising:

i) a first inner element comprising on its periphery a plurality of opening regions into which cables can be laid;

ii) first sealing means prepositioned in, or positioned, in use, in the opening regions in the inner element to enhance the seal between the opening regions in the element and the cables led therethrough; and iii) outer circuit element that are shaped to cooperate with the inner element and which can be moved towards the inner element to form divided cable openings containing within them the cable and the sealing means and which can be moved away from the inner element to allow insertion or removal of the cables, the outer circuit elements being tightenable towards each other by a tightening device, to seal the cables between the inner element and the outer circuit elements wherein, in use, a second seal, separate from the said first sealing means, is formed between the sealing plate and the cable coupling housing.

The cables can be inserted in use into the sealing means that is positioned in the device. As an alternative, the cables can be contained within the sealing material as it is positioned in the openings in the inner element The term "divided cable opening" means that part of the surface defining the cable opening is provided by one element, and another part of the surface defining the cable opening is provided by another element.

The sealing means may, for example, comprises a mass of mastic, or a mass of gel, positioned directly into the cable opening.

An advantage of the present invention is that there is only one plane of separation (between the inner element and the outer circuit elements) which provides a plurality of openings for receipt of cables. The inner element provides recesses into which the cables can be laid. The externally surrounding outer circuit elements provide for fixing and sealing. The number of possible openings for receipt of cables is dependent merely upon the outer diameter of the cables to be introduced, and upon the size of the outer periphery of the inner element. This is a considerable advantage compared to the prior art device described in DE 2427677.

In a preferred embodiment of the invention the opening regions for receipt of the cables may be closed in the unused position, i.e. before the initial installation. The opening regions may be initially closed. by means of detachable elements e.g. disc shaped elements, which can be integrally joined to the inner element by means of predetermined breaking points.

The use of detachable elements which must be removed to allow entry of the cables, and which otherwise are closed, means that the number of cables entering and leaving the cable coupling sleeve can be selected at the initial installation, and can subsequently be increased at any time. If a coupling sleeve embodying a sealing device according to the invention is used, for example in a telecommunications network, and after the initial installation and connection of cables, further connections for the telephone sector are desired, then the coupling sleeves can simply be opened, the appropriate number of detachable elements removed, and the new cables inserted, in order to connect new subscribers. By this method it is not necessary to carry out any manipulations on the existing wire connections which would otherwise be necessary. All that is required is for a detachable segment to be detached and for a cable to be inserted and spliced in, after which the coupling sleeve can be closed again. In order to allow for this re-entry and expansion of the coupling connections more detachable elements should be included than are thought necessary initially.

It is advantageous for the outer periphery of the detachable elements to be substantially "U"-shaped in plan view. Preferably the "U"-shaped detachable element is provided with a further detachable segment projecting from the base of the "U" of the detachable element. The purpose of this extra detachable segment is to provide an opening for receipt of an optional sealing wedge. The sealing wedge, if present is preferably positioned between (i) the inner element and (ii) the inserted cable (and optional sealing material) around the cable.

Preferably a deformable sealing composition is provided around the cables. As an alternative preferred embodiment ring seals may be used, for example as are known from DE 36 07 355 A1.

The detachable elements provided may be of the same size, or of different size for example in addition to providing the detachable elements having a "U"-shape in plan view for individual cables there may also be provided on the inner disc element at least one detachable element of larger surface area. This may be required, for example, for an incoming or outgoing multiple-conductor cable pair, or for an uncut cable, a loop of which is to be inserted into the cable housing and connections taken therefrom.

In a preferred embodiment the outer circuit elements are constructed as divided circle segments. Preferably each outer circuit element has a sealing groove facing inwards.

The outer circuit elements when in the form of divided circle segments or shapes other than circular, as described below may, in principle, be constructed as rotationally symmetrically identical semi-circular (or other shaped) segments. Another possibility is to effect a different division of the circle (or other shaped) segments such that, for example, there is one segment subtending an angle greater than 180° C. With this embodiment it is possible for a curved (or other shaped) region of more than 180° to be equipped in the initial installation with incoming or outgoing cables by opening only one of (the larger of) the circular (or other shaped) segment outer circuit elements. This leaves a smaller region initially unoccupied. If and when the coupling sleeve is opened again to add further cables, only a small circle (or other shape) segment needs to be removed for further cable installation.

The articulation of the circle (or other shaped) segments of the outer circuit elements to each other is preferably effected by hinges, screw connections or in another manner. Tightening can also be effected by means of a rapid tightening device, for example by a tightening strap having swivelling and tightening levers. The tightening strap may extend around the outside.

While the preferred embodiment uses an inner disc element and circular outer ring elements, other cooperating shapes may be used, e.g. square, oval, rectangular etc provided the outer elements correspond to the inner disc. The term "ring" element merely means outer circuit, which is not necessarily curved or circular.

In order to be able to fasten the device to a coupling sleeve body, the outer circuit elements are preferably provided with a conical clamping shoulder pointing outward, for connection by a clamp to a similar shoulder on the cable coupling sleeve body.

It makes no difference whether the device is fastened to a coupling sleeve according to DE 36 07 355 A1 already mentioned above or to another coupling sleeve having corresponding devices at both ends.

In a preferred embodiment the outer circuit elements are provided with an inner engagement groove, which engages with outwardly pointing projections on the central inner element. The engagement is preferably form-fit in the closed position. This embodiment has the advantage that a form-fit between the inner element and the externally surrounding outer circuit element is always guaranteed and, in particular, handling and mounting are made easier. Good positioning of the individual elements relative to one another is highly advantageous, especially when the seal comprises a plastic or elastic sealing composition surrounding the cables, which can allow displacement of the individual elements relative to each other, and which could result in displacement of the elements and, associated unintentional leaking.

In order to position all the elements accurately relative to one another and, not least of all, to position the incoming and outgoing cables accurately, it is expedient to provide the inner element with an outwardly widening wedge surface, positioned centrally, so that a pressing wedge pin can be inserted between the wedge surface of the inner element and the inserted cables so as to position and secure the cables correctly. In a particularly preferred embodiment the wedge surface of the inner element may extend, away from the cable housing into a supporting core, which may be adapted to support the cables before they enter the sealing plate, and which preferably provides strain relief.

The wedge surface of the inner element serves on the one hand to form a support and positioning body for the cables and, on the other hand, as a support surface against which the pressing wedge pins mentioned hereinbefore can be positioned, to urge the cables into sealing engagement with the outer circuit elements and sealing material.

The supporting core body which preferably extends from the wedge surface of the disc element is preferably provided on its outer surface with supporting troughs for entering cables. Preferably a clamping element, such as a tightening band or the like is also provided to fix the entering cables onto the supporting core body, and to provide strain relief.

In another preferred embodiment mounting supports for the divided outer circuit elements are provided either on the core body or on the wedge pin of the inner element.

In another embodiment according to the invention an additional adaptor is provided. Thus instead of the cables being fitted directly into recesses in the sealing plate, instead an adaptor is provided which may seat one or more cables, and which itself fits in recess in the sealing plate. Different types of adaptor may be provided to fit into a single shaped and sized recess in a sealing plate, thereby making it possible to adapt the same sealing plate to seal different numbers and/or sizes and/or shapes of cables simply by changing the inserted adaptor. In one embodiment to adaptor comprises a container containing sealing material in channels, or slots, with individual cables being inserted in respective channels or slots. The sides of the channels or slots is preferably flexible to adapt to slight variations in cable size and to seal to the cables. The adaptor may be arranged so that the openings of the channels or slots face towards or away from the inner disc element, or both. The adaptor may be provided with means for securing it to the inner disc element.

In another embodiment the adaptor is designed to be inserted into the recess in the sealing plate simultaneously with the cable or cables, the shape of the adaptor being such that the sides of the adaptor fold around the cable(s) as the adaptor/cable(s) are pushed into the recess. A particular preferred embodiment of this kind has sides that fold around to encase a single cable.

The sealing material in the adaptor may simply be positioned within cable receiving channels in the adaptor. Alternatively separating ribs may be included in the adaptor, and sealing material be included between each of the ribs.

The invention is described in detail below by way of example with reference to the drawings, in which FIG. 1 shows a cross-section through the sealing region of a cable coupling sleeve including a device according to the invention;

Figure 1:
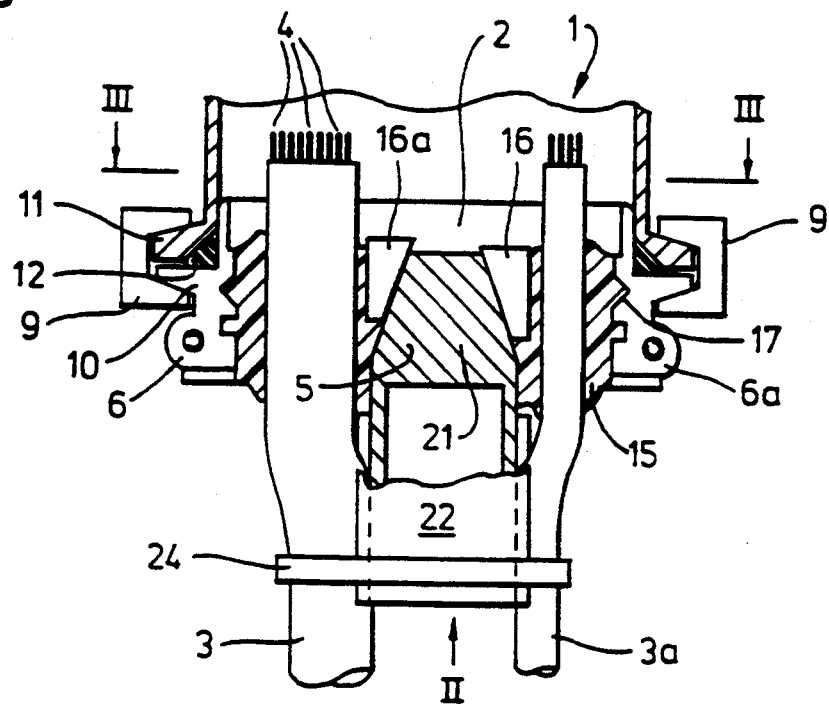

Referring to the drawings, a cable coupling sleeve generally designated 1, of which only one region is shown in FIG., 1, is sealed at the end thereof in the closed position by a sealing plate according to the invention, generally designated 2.

The cable coupling sleeve 1 serves to receive and distribute incoming and outgoing cables, generally designated 3 and 3a in FIG. 1. The cable conductors are shown merely by way of suggestion and are designated 4.

In the example according to the examples shown, the sealing plate 2 is formed substantially by an inner central disc element 5 arranged on the inside and by outer circuit ring elements 6 and 6a arranged at the outside edge. Cables to be coupled in the cable coupling sleeve 1 pass between the central disc 5 and outer ring elements 6, 6a and are sealed therebetween, as described in detail below.

Figure 2:
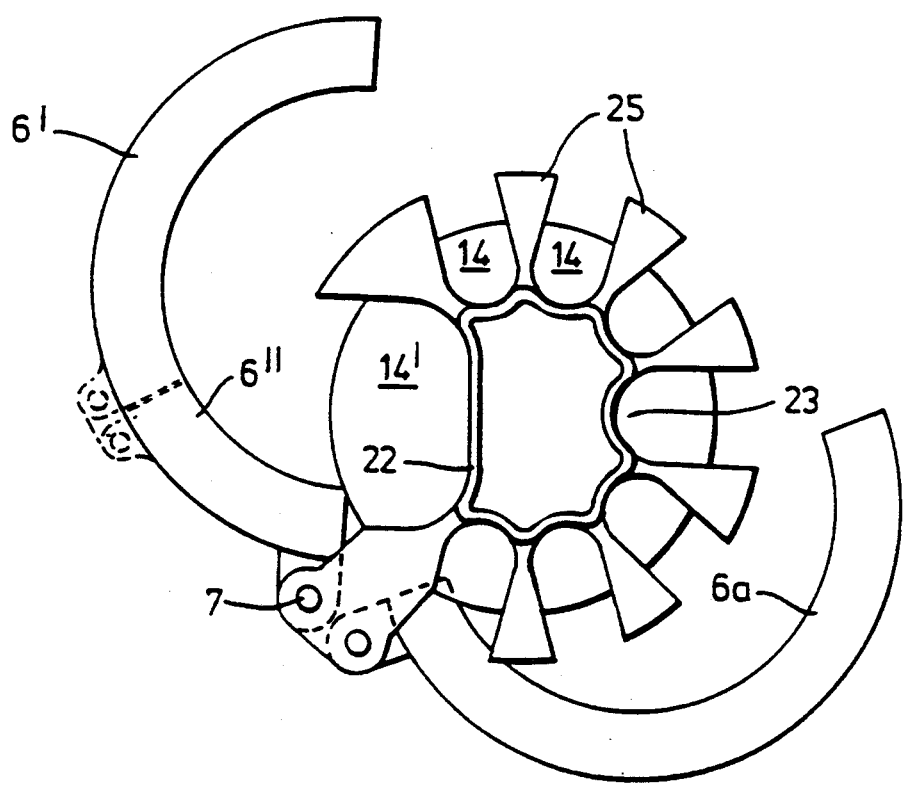
FIG. 2 shows the cable coupling sleeve viewed from below according to the arrow II in FIG. 1, without cables inserted.
Figure 3:
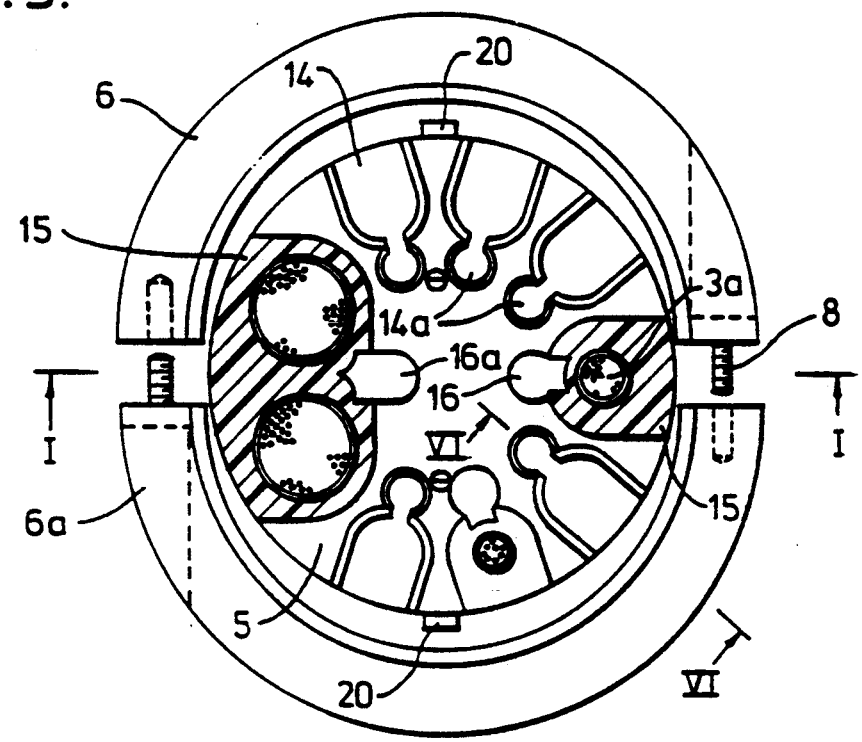
FIG. 3 shows a section along the line III—III in FIG. 1.

The ring elements 6 and 6a can be pivoted open and closed by means of hinge joints 7 (see FIG. 2), or can be tightened to each other by screw connections 8 (see FIG. 3).

In the closed position, the sealing plate 2 formed by the disc element 5 and the ring elements 6 is positioned at the end of the cable coupling sleeve 1. The sealing plate 2 is tightened to the coupling sleeve 1 by means of an additional tightening element, designated 9. The tightening element 9 is positioned over-clamping shoulders 10 and 11 provided on the ring elements 6, 6a and on the cable coupling sleeve 1 respectively. A seal 12, e.g. a rubber seal, is interposed between the clamping shoulders 10 and 11 to enhance the seal.

Figure 4:
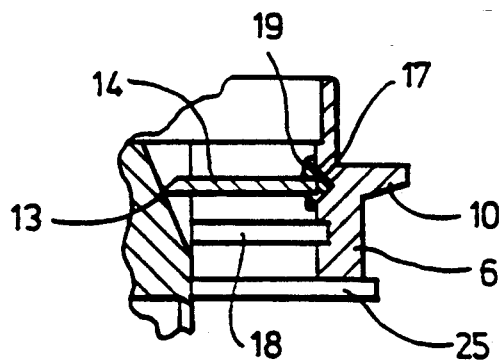
FIG. 4 shows a partial cross-section along the line IV—IV in FIG. 3.

The disc element 5 has, integrally connected thereto by way of predetermined breaking points 13 (see FIG. 4), a plurality of removable elements 14. In plan view, the removable elements 14 are substantially "U"-shaped (see FIGS. 2 and 3). The elements 14 also include removable segments 14a, similarly integrally connected by the predetermined breaking points 13, pointing towards the inside of the device. When such a removable element 14 has been removed and a cable, for example the cable 3a. has been inserted, the surrounding region is filled with an elastic or plastic seal 15, as will be seen from the Figures. In order to be able to obtain an additional sealing pressure when the ring elements 6 are closed, squeezing wedges 16 or 16a can be inserted into the space previously occupied by the removable segments 14a, to urge the sealing material 15 against inserted cables 3a.

In the closed position, ring elements 6 have, facing towards the inside or the device, a sealing groove 17 and a guide groove 18. The sealing groove 17 is occupied by a seal 19 e.g. of rubber. The guide grove 18 engages with projections 20 which project outwards from the disc element 5, to guide the ring elements 6 into correct alignment with the disc element 5.

The inner disc element 5 continues integrally outwards, in a direction parallel to the axis of the cable coupling housing, into a centrally arranged wedge shaped surface 21. The wedge surface 21 in turn widens to form a supporting core body 22 with supporting recesses 23 for incoming and outgoing cables, as shown in FIG. 2. After inserting the cables, they can be pressed into the supporting recesses 23 and the supporting body 22 by a band-type tightening element 24. The band tightening element 24 may, for example, provide strain relief.

In order to facilitate mounting when splicing and unsplicing the cables and, especially, also the closing of the sealing device 2, supports 25 may be provided on the wedge surfaces 21 in the region of transition to the supporting core body 22. The ring elements 6, 6a are able to rest on the mounting supports 25 when the device is closed.

In addition to the single removable elements 14 for individual cables, it is also possible to provide a removable element 14' of larger surface area for an incoming cable pair, as shown in FIG. 3.

The device operates as follows:

When a cable coupling sleeve is being mounted, first of all removable elements 14, 14a and 14' corresponding to the number of incoming and outgoing cables 2 and 3a are removed from the disc element 5, the removal being so distributed over the periphery that subsequently, if necessary, only one of the outer ring elements 6 or 6a needs to be opened.

After inserting the cables with appropriately prepared seals 15, the open outer ring elements are closed and tightened to each other so that at least to such a sleeve 1 one overall impermeable sealing element is produced.

If a cable is to be replaced and a further one is to be inserted, a corresponding arc region of the ring elements 6 is opened (it is repeated at this point that the ring elements may be divided still further), the removable elements 14 are correspondingly removed, a seal together with cable is inserted and the ring elements are closed again.

Figure 5:
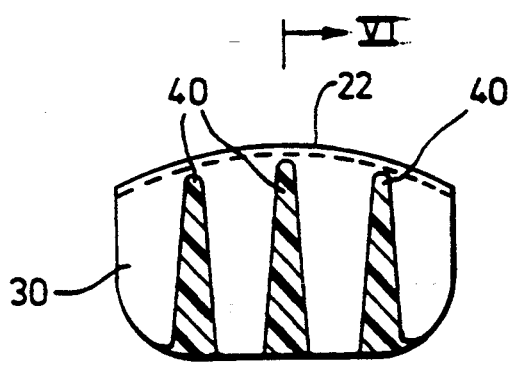
FIG. 5 shows in plan view an adaptor piece than can be used according to another embodiment of the invention.
Figure 6:
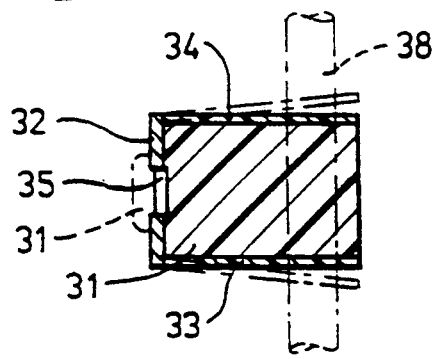
FIG. 6 is a cross-section through the line VI of FIG. 5.
Figure 7:
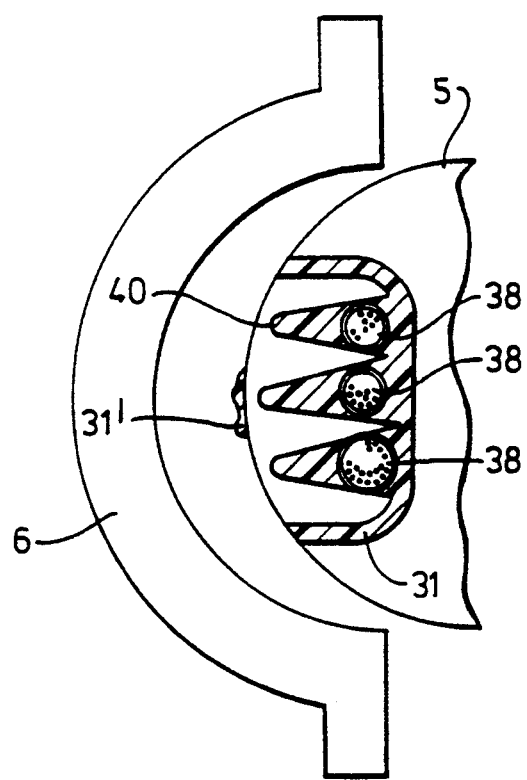
FIG. 7 shows the adaptor of FIGS. 6 and 7 installed in use in a device according to the invention.

FIGS. 5 to 7 shows an adaptor that can be used in a device according to the invention. The adaptor comprises a container 30 made of plastic material and containing three channels 40, the sides 33 and 34 of which are flexible and can move apart to accommodate insertion of a cable. The channels 40 are filled with a sealing material 31 such as a mastic or a gel. The back 32 of the container 30 is stiff, and is in the shape of an arc of a circle. The back 32 contains an opening 35 and exuded sealing material 31' can pass through the backing 32 when a cable 38 is inserted into channels 40.

In use (see FIG. 7) cables 38 are inserted into channels 40 in the adaptor, and then the adaptor is positioned within one of the recesses at the outer edge of the inner disc element 5. The adaptor is positioned and shaped so that the openings of the channels face the inner disc element 5, and the back 32 of the container aligns with the remaining periphery of the inner disc element (which in the example shown in FIG. 7 is circular). Exuded sealing material 31' is wiped from the back of opening 35 and the outer ring elements 6 closed around the inner disc element 5 and adaptor 30.

It will be appreciated that while the adaptor illustrated contains three channels, other variations are possible. Thus this adaptor modification makes it possible with a single inner disc element with a set number of outer recesses, and a variety of different adaptors, to adapt the device for sealing different numbers and sizes of cables.

Figure 8:
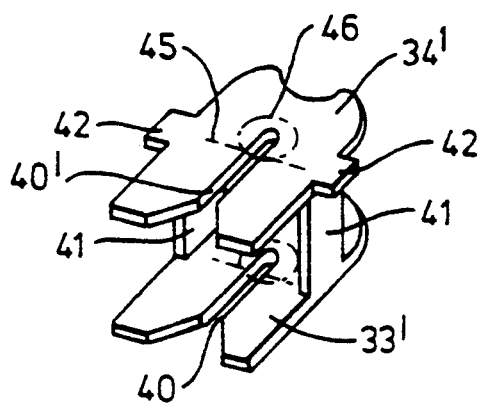
FIGS. 8 and 9 are perspective views of other embodiments of adaptor pieces that can be used in the device according to the invention.

FIG. 8 shows another embodiment of adaptor in this case flexible surfaces 33' and 34' each containing a slot 40' are connected by bars 41. The adaptor is also provided with fingers 42 for fixing the adaptor into the recess in the inner disc element 5. In this case the adaptor may be first fixed into the recess in the disc element 5, and then the cables pushed into the slots 40' in the surfaces 33', 34'. For further flexibility surfaces 33', 34' may be provided with cuts towards there bases as shown by dotted lines 45. Also to improve flexibility the base of slot 40' may terminate in a cut-out circle as shown by dotted line 46.

Figure 9:
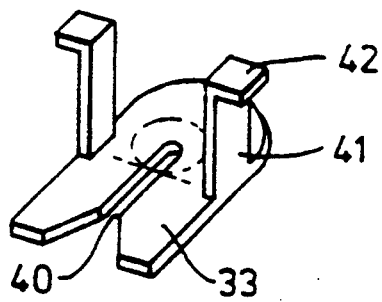

FIG. 9 illustrates an embodiment similar to FIG. 8, with like parts being referenced by like reference numerals. In this case the adaptor comprises only one surface 33' with bars 41 and fixing fingers 42.

In both the embodiments shown in FIGS. 8 and 9 sealing material is also provided around slots 40 to seal around the inserted cables.

Figure 10:
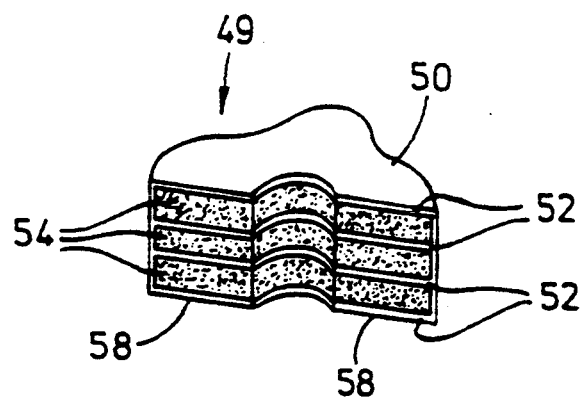
FIG. 10 is a perspective view of another adaptor piece that can be used according to the invention.
Figure 11:
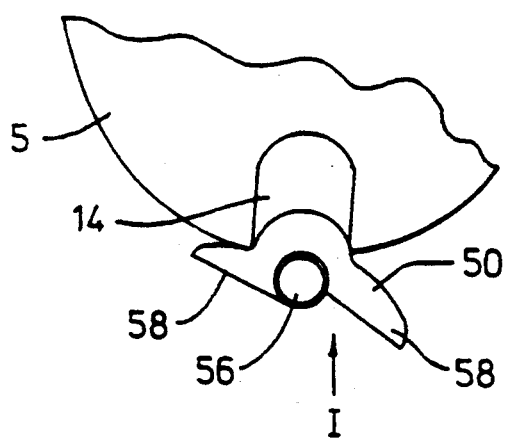
FIGS. 11 and 12 are perspective and plan views respectively showing successive stages of the installation of the adaptor of FIG. 10.
Figure 12:
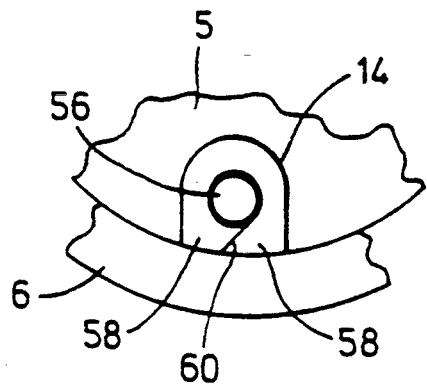

FIGS. 10 to 12 show another embodiment of adaptor 49 according to the invention. In this case the adaptor 49 is designed to contain a single cable only. The adaptor 49 comprises a flexible rubber or plastic cover 50, comprising integral ribs running in a plane perpendicular to the axis of the inserted cable. The adaptor 49 has sides 58. The spaces between the ribs 52 is filled with sealing mass 54. The adaptor 49 is designed to be inserted into recess 14 in the inner disc element 5 simultaneously with a cable 56. This is illustrated in FIG. 11, direction of insertion being indicated by arrow "1". The cover 50 and ribs 52 are flexible, and the size and shape of the adaptor is such that as the cable 56 and adaptor are inserted the sides 58 of the adaptor 49 fold around the cable 56. FIG. 12 show the final position, and it can be seen that the sides 58 of the adaptor completely enclose cable 56, the sides 58 of the adaptor abutting at a sealing face 60. FIG. 12 also shows ring element 6 positioned around the inserted adaptor 49 and cable 56.

The described embodiments of the invention can, of course, be further modified in various respects without departing from the basic concept. For example, the inner central disc element 5 may have a different outer contour, for example may be square, oval or the like, and the externally surrounding outer circuit elements 6 may be shaped accordingly.

We claim:

1. A device for sealing a cable joint, comprising:
   (a) a cable coupling housing;
   (b) a sealing plate that can fit at one end of the housing comprising:
      (i) a first inner element comprising on its periphery a plurality of openings into which cables can be laid;
      (ii) first sealing means prepositioned in, or positioned, in use, in the openings in the inner element to enhance the seal between the openings in the element and the cables led therethrough;
      (iii) outer circuit elements that are shaped to cooperate with the inner element and which can be moved towards the inner element to form divided cable openings containing within them the cable and the sealing means and which can be moved away from the inner element to allow insertion or removal of the cables;
      (iv) the outer circuit elements being tightenable towards each other by a tightening device(8), to seal the cables between the inner element and the outer circuit elements; and
      (v) a second sealing means (12) at the periphery of the outer circuit elements; wherein, in use, a second seal, separate from the said first sealing means, is formed between the sealing plate and the cable coupling housing, the second sealing means forming or enhancing the said second seal between the sealing plate and the cable coupling housing.

2. A device according to claim 1, wherein the inner element is arranged substantially centrally within the outer circuit elements.

3. A device according to claim 1, wherein the openings in the periphery of the inner element are substantially U-shaped.

4. A device according to claim 1, characterised in that the opening up comprise detachable elements (14) which are shaped substantially as a filled "U" in plan view, and which are provided with a further detachable segment (14a) projecting beyond the base of the filled "U"-shaped which can form a receiving opening for a wedge pin (16).

5. A device according to claim 1, characterised in that the openings comprise two or more detachable elements (14) having a shape that is substantially a filled "U" in plan view of similar size for receiving individual cables, and also at least one detachable element (14') of larger surface area, for receiving an incoming or outgoing multiple-conductor cable pair of larger cross-section.

6. A device according to claim 1 characterised in that the outer ring elements are constructed as divided circle segments (6, 6a) each having a sealing groove (17) facing inward of the ring.

7. A device according to claim 6, characterised in that the outer circuit elements (6, 6a) are provided with a clamping shoulder (10) which is preferably conically shaped and pointing outwards of the outer circuit element.

8. A device according to claim 1 wherein the articulation of the outer circuit elements to each other is effected by hinges.

9. A device according to claim 1, characterised in that the outer circuit elements (6) are provided with an inner engagement means, preferably a groove (18), and the inner element (5) is provided with outwardly pointing cooperating engagement means, preferably projections (20), the engagement means cooperating together in a form-fit in the closed position.

10. A device according to claim 1, characterised in that the inner element (5) is provided with wedge shaped surfaces between which surface and the outer circuit elements, pressing wedge pins can be inserted.

11. A device according to claim 10, characterised in that the wedge surface (21) continues in a direction away from the sealing plate into a supporting core body (22).

12. A device according to claim 11, characterised in that the supporting core body (22) is provided on its outer surface with supporting troughs (23) for entering cables.

13. A device according to claim 12, characterised in that a clamping element (24), such as tightening band or the like, which fixes the entering cables (3) on the supporting core body (22) is provided.

14. A device according to claim 1, characterised in that mounting supports (25) are provided on the inner element for mounting divided outer circuit elements.

15. A device for sealing a cable joint, comprising:
(a) a cable coupling housing;
(b) a sealing plate that can fit at one end of the housing comprising:
  i) a first inner element comprising on its periphery a plurality of detachable elements, which can be detached, in use, to provide a plurality of openings into which cables can be laid, the detachable elements being integrally and detachably Joined to the remainder of the inner element, before insertion of the cable, by means of predetermined breaking points;
  ii) first sealing means prepositioned in, or positioned, in use, in the openings in the inner element to enhance the seal between the openings in the element and the cables led therethrough;
  iii) outer circuit elements that are shaped to cooperate with the inner element and which can be moved towards the inner element to form divided cable openings containing within them the cable and the sealing means and which can be moved away from the inner element to allow insertion or removal of the cables; and
  iv) the outer circuit elements being tightenable towards each other by a tightening device (8), to seal the cables between the inner element and the outer circuit elements;
wherein, in use, a second seal, separate from the said first sealing means, is formed between the sealing plate and the cable coupling housing.

16. A device for sealing a cable Joint, comprising:
(a) a cable coupling housing;
(b) a sealing plate that can fit at one end of the housing comprising:
  i) a first inner element comprising on its periphery a plurality of detachable elements, which can be detached, in use, to provide a plurality of openings into which cables can be laid;
  ii) first sealing means prepositioned in, or positioned, in use, in the openings in the inner element to enhance the seal between the openings in the element and the cables led therethrough;
  iii) outer circuit elements that are shaped to cooperate with the inner element and which can be moved towards the inner element to form divided cable openings containing within them the cable and the sealing means and which can be moved away from the inner element to allow insertion or removal of the cables;
  iv) the outer circuit elements being tightenable towards each other by a tightening device (8), to seal the cables between the inner element and the outer circuit elements; and
  v) an adapter (30) which can be secured in one of the openings, and which can receive and seal one or more cables (38) between it and the inner element (5) and/or the outer circuit elements (6);
wherein, in use, a second seal, separate from the said first sealing means, is formed between the sealing plate and the cable coupling housing.

17. A device according to claim 16 wherein the adaptor (30) comprises a container containing one or more channels (40), filled with sealing material (31), one channel (40) being provided for each of the cables (38) to be received.

18. A device according to claim 17 wherein the channels (40) extend from one side of the container towards the base of the container and wherein, in use, the adaptor (30) is shaped and positioned such that the openings of the channels (40) face towards the recess in the inner element (5), and the base of the container (32) aligns with the outer periphery of the non-recessed part of the inner element (5) and thereby abuts against the outer circuit elements (6) in the closed position.

19. A device according to claim 16, wherein the adaptor is shaped relative to the recess in the sealing plate such that the cable(s) and adaptor are arranged to be inserted simultaneously into the recess, the sides of the adaptor being flexible and folding around the cable(s) as the adaptor and cable(s) are inserted into the recess.

* * * * *